United States Patent Office 3,314,664
Patented Apr. 18, 1967

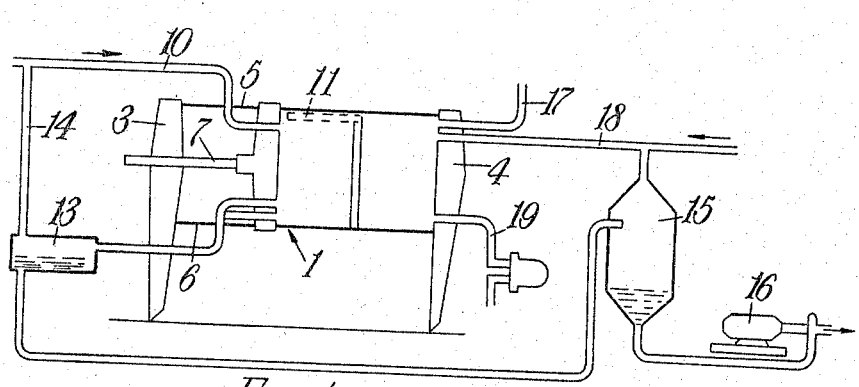
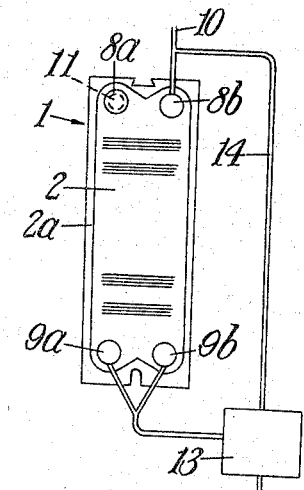
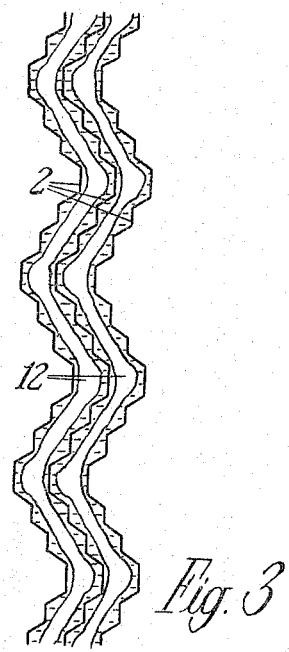

3,314,664
STEAM HEATING OF LIQUIDS
George A. Dummett, Crawley, Sussex, England, assignor to The A.P.V. Company Limited, Crawley, Sussex, England
Filed Jan. 17, 1964, Ser. No. 338,377
Claims priority, application Great Britain, Jan. 22, 1963, 2,742/63
4 Claims. (Cl. 261—159)

This invention relates to the heating of liquids, more particularly beverages, and has as its objects the provision of an improved and simplified apparatus for effecting such heating.

The invention relates to apparatus for heating liquids wherein the liquid to be heated runs in the form of a thin film over a corrugated trickling surface while being simultaneously brought into contact with steam which condenses in the liquid to raise its temperature.

Such a heating apparatus provides a solution to the problem of heating heat sensitive materials, such as milk, to a temperature sufficient for the destruction of unwanted bacteria, yet at the same time minimizing the temperature of contact in the apparatus by using direct contact with the vapor and also a thin product film and thus a short conduction path within the product.

The invention finds particular utility in the heat treatment of milk to ensure sterility while retaining the natural taste and flavor of the raw product.

The invention consists in apparatus for heat treating liquids, comprising heating apparatus in the form of a frame, a plurality of spaced substantially vertical corrugated trickling plates mounted in the said frame and positioned so as to form channels therebetween, which channels are sealed from their external surrounding, upper header means interconnecting the tops of said channels for introducing liquid thereto, and separate lower header means interconnecting the bottoms of said channels for discharging liquid therefrom, the arrangement being such that the liquid trickles down the channels over said trickling plates whilst steam is introduced to one or other, or both, of said header means so as to diffuse through the channels and condense in the downwardly flowing liquid to raise its temperature, and a flash vessel connected to the lower header means for flashing off at least part of the steam condensed. Preferably the upper header means comprise a pair of spaced apart ducts, one of which supplies liquid to the channels, whilst the other supplies steam thereto.

A liquid is able to condense more steam the lower its temperature and the higher the saturated steam pressure acting thereon. Moreover, the area of the phase interface, the contact time, and the turbulence at the surface of contact are decisive for efficient condensation of steam into the liquid. Trickling surfaces offer ideal conditions to fulfill requirements of rapid diffusion and condensation.

Moreover, hygienic requirements also have to be observed when producing beverages or liquids for human consumption which require to be processed by heating and according to the invention the trickling apparatus is so designed that the internal channels traversed by the liquid may be easily cleaned or sterilized and provide access for visual inspection after cleaning.

With certain beverages, it is essential that there is no dilution during heat treatment. Thus, the heating process includes a flashing step whereby an amount of water, equal to the amount of steam condensed in the liquid, is subsequently evaporated therefrom. This is conveniently effected in a suitable flashing vessel. If the input to the steam heating stage is hotter than the incoming liquid, the initial heating may be effected in a preheating unit contained within the heating apparatus.

The invention will be further described in one embodiment, given by way of example only and illustrated in the accompanying drawings, wherein:

FIGURE 1 is a diagrammatic view showing the layout of a complete steam heating plant incorporating the preferred form of the invention, FIGURE 2 is a diagrammatic illustration of the layout of a direct steam heating stage of the plant of FIGURE 1, and FIGURE 3 is a diagrammatic section through a portion of a group of plates of the stage of FIGURE 2, showing the liquid flow in an exaggerated form.

In carrying the invention into effect according to the preferred mode illustrated, liquid steam heating apparatus 1 is constructed from a plurality of corrugated single flow plates 2 of the type commonly used in heat exchangers. The frame of the apparatus consists of two uprights 3 and 4 connected by means of two supporting shafts 5 and 6. The upright 3 is provided with pressure application means 7 to press the individual corrugated plates together with a sealing effect upon peripheral gaskets 2a to form a plate pack. The plates 2 are provided (see FIGURE 2) with pairs of holes 8a, 8b, 9a and 9b at their upper and lower ends respectively such that when pressed together in sealing engagement as above, these holes align to form transverse upper and lower pairs of ducts through the pack forming upper and lower header means, the shape of the plates being such that these header means communicate with trickling channels formed between the plates. The upper duct formed by the holes 8b is connected to a supply of steam from a line 10 while the upper duct formed by the holes 8a is connected to a perforated pipe 11 carrying a supply of liquid which is to be heated. The quantity of liquid passing through the apparatus, which flows only in one direction, viz downwardly from above, is so small that it does not normally fill the trickling channels (see FIGURE 3) between the plates thus allowing an adequate volume 12 for diffusion of steam and condensate in the liquid. It will be seen from FIGURE 3 that the plates are rippled in section as well as being corrugated.

When liquid flows as a film down a corrugated plate, the film thickness changes with the curvature of the surface becoming thinner on the external radii and thicker on the internal radii or on the more horizontal and flatter sections. Furthermore, when a series of plates of identical pressing are put together to form a plate pack, there is a change of section in the flow passage formed by two adjacent plates to give conditions of expansion and contraction. The net result is to give turbulent flow conditions to the material flowing down the plate, resulting in rapid heat transfer and less temperature difference across the conduction layers. Furthermore, the film thickness will be greatest at the points where the plates are closest together and this may result in local bridging which is not harmful and indeed gives redistribution to the flow during its downward passage.

Liquid is discharged from the apparatus through the lower header means formed by the holes 9a and 9b, and a steam trap 13 is provided to prevent steam escaping therewith. A line 14 from the steam main 10 is also connected to the lower header means to ensure even pressure across the plates.

From the steam trap 13, the hot liquid is passed to a flash vessel 15 in which a quantity of steam, equal to the amount of condensate acquired during direct steam heating is evaporated under reduced pressure. The liquid is removed from the flash vessel by a pump 16.

The liquid to be heated may be subjected to an indirect exchange preheating step in a set of plates mounted in the same frame, and for this purpose the liquid is fed in via a line 17 in indirect heat exchange relationship with steam from a line 18. The liquid leaving is fed to perforated pipe 11 and the steam is taken off via a line 19. The steam line 18 may be connected to the flash vessel 15.

The velocity of flow between a pair of plates must not exceed that required to ensure that the plate runs full, i.e. the pressure loss must in all cases be less than the static head represented by the distance between the entry port at the top and the discharge port at the bottom. On the other hand the flow rate must be sufficient to cause an adequate wetting of the entire plate surface.

Using the smaller of the current A.P.V. heat exchanger plates this gives us a working range of between 12 and 50 gals./hour/plate. On the larger A.P.V. heat exchanger plates this range may be between 25 and 100 gals./hour.

In a specific example of operation according to the invention 1,100 gals./hour of raw milk, to be sterilized by high temperature short time treatment, is first supplied to a conventional heat exchanger where it is heated first by regeneration with processed hot milk, and secondly by an indirect steam heater or hot water heater to a temperature of 185° F. After this pre-heating stage, it is fed to the direct contact film heater where, using a drilled distribution tube passed axially along top ports in corrugated vertical stainless steel plates, it is made to flow as a thin film on both sides of each of 40 plate units. Steam enters from a similar top port in the corrugated plates and has free access to all plate units. The temperature of heating is controlled by regulating the pressure in the heat exchanger and the milk product is heated to 280° F. Immediately following the film heater the milk passes through a flash valve to a separator where it is quickly cooled by flash evaporation to 185° F. The exact temperature is regulated by controlling the pressure, in this case a vacuum, in the flash chamber, and this in turn is set by a ratio controller which ensures that the temperature of the milk returning to the regenerator is exactly equal to the temperature of the milk supplied to the direct steam heating section. In this way with the ratio set at 1:1 there is no concentration or dilution of the product. The partly cooled product is now supplied to the regenerative section of the conventional heat exchanger where it is cooled from 185 to 65° F. and it is then further cooled by chilled water to 40° F.

It will be appreciated that the above description is only by way of example, and numerous modifications of the apparatus are possible within the scope of the invention. For example, instead of employing a plate pack comprising a plurality of separate plates held in operative engagement by pressure applying means the pack may comprise a plurality of plates suitably spaced apart and fixed within a single casing, suitable upper and lower header means such as one or more transverse pipes leading into the casing being provided for the supply of steam and liquid.

The invention is not to be confined to any strict conformity to the showings in the drawings but changes or modifications may be made therein so long as such changes or modifications mark no material departure from the spirit and scope of the appended claims.

I claim:

1. Apparatus for heat treating liquids, comprising a heating apparatus in the form of a frame, a plurality of spaced, substantially vertical, corrugated trickling plates mounted in said frame end positioned to form trickling channels therebetween, gasket means between said plates to seal the trickling channels, upper header means interconnecting the top of said channels for introducing liquid thereto, lower header means interconnecting the lower ends of the channels for discharging liquid therefrom, means for introducing steam into said channels via at least one of said header means so as to diffuse through said channels and condense in liquid trickling downwardly in said channels to raise its temperature, and means including a flash vessel connected to said lower header means for flashing off at least part of the steam condensed with liquid.

2. Apparatus as claimed in claim 1, in which the upper header means comprise a pair of spaced apart duct, one of which supplies liquid to the channels, while the other supplies steam thereto.

3. Apparatus as claimed in claim 1, in which the corrugated plates are also rippled to ensure that even distribution is maintained throughout the flow length.

4. Apparatus as claimed in claim 1, comprising an indirect preheating stage, comprised by heat exchanger plates mounted in said frame.

References Cited by the Examiner

UNITED STATES PATENTS

| | | | |
|---|---|---|---|
| 592,670 | 10/1897 | Stilwell | 261—112 |
| 2,206,440 | 7/1940 | Walker | 261—112 |
| 2,516,099 | 7/1950 | Board et al. | 99—212 |
| 2,623,736 | 12/1952 | Hytte | 165—166 X |
| 2,712,504 | 7/1955 | Coulter | 99—215 |

FOREIGN PATENTS

| | | |
|---|---|---|
| 1,224,329 | 2/1960 | France. |

HARRY B. THORNTON, *Primary Examiner.*

A. LOUIS MONACELL, RONALD R. WEAVER, M. W. GREENSTEIN, *Assistant Examiners.*